(12) United States Patent
Julka et al.

(10) Patent No.: US 8,315,160 B2
(45) Date of Patent: *Nov. 20, 2012

(54) METHOD AND APPARATUS FOR NETWORK IMPOSED PACKET DATA FLOW CONTROL

(75) Inventors: Vibhor Julka, San Diego, CA (US); Roger Gustavsson, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 484 days.

This patent is subject to a terminal disclaimer.

(21) Appl. No.: 12/501,200

(22) Filed: Jul. 10, 2009

(65) Prior Publication Data

US 2009/0279485 A1    Nov. 12, 2009

Related U.S. Application Data

(63) Continuation of application No. 10/814,550, filed on Mar. 31, 2004, now Pat. No. 7,586,847.

(51) Int. Cl.
*H04J 3/14* (2006.01)
(52) U.S. Cl. .................... 370/229; 370/328
(58) Field of Classification Search .......... None
See application file for complete search history.

(56) References Cited

U.S. PATENT DOCUMENTS

| 7,483,373 B2 * | 1/2009 | Willey et al. ............ 370/231 |
| 7,586,847 B2 * | 9/2009 | Julka et al. ............. 370/235 |
| 2003/0076804 A1 * | 4/2003 | Sivalingham ............ 370/338 |

* cited by examiner

*Primary Examiner* — Kevin C Harper
(74) *Attorney, Agent, or Firm* — Coats & Bennett, P.L.L.C.

(57) ABSTRACT

A method and apparatus provide network-based flow control for mobile station having data connections to the network. In an exemplary embodiment, a Packet Control Function (PCF) in a Radio Access Network (RAN) requests that a Packet Data Serving Node (PDSN) in a Packet Core Network (PCN) turn flow control on and off as needed for mobile station data connections. That is, if the PCF receives data from the PDSN for delivery to a mobile station that the PCF determines to be unavailable, the PCF requests that data transfers from the PDSN be suspended for that mobile station. Such suspension avoids needless continued transfer of undeliverable data to the PCF. The PCF monitors or otherwise determines whether a flow-controlled mobile station has become available again and, if so, notifies the PDSN so that it can lift the suspension and resume data transfers as needed.

18 Claims, 10 Drawing Sheets

US 8,315,160 B2

METHOD AND APPARATUS FOR NETWORK IMPOSED PACKET DATA FLOW CONTROL

RELATED APPLICATION

This application is a continuation of U.S. patent application Ser. No. 10/814,550, filed Mar. 31, 2004 and issued on Sep. 8, 2009 as U.S. Pat. No. 7,586,847.

BACKGROUND OF THE INVENTION

The present invention generally relates to wireless communication networks, and particularly relates to packet data flow control within the network.

A typical wireless communication network that supports packet data connections includes some type of packet network that interfaces mobile stations supported by a radio access network with one or more packet data networks, such as the Internet. Details vary depending on the equipment vendor and the relevant communication network standards (e.g., cdma2000, W-CDMA, etc.), but a basic scheme depends on the use of a packet router that routes packet data to and from the radio access network. In cdma2000 network standards, this packet router is referred to as a Packet Data Serving Node (PDSN).

In turn, the radio access network includes a radio-to-packet interface entity that transfers packet data incoming from the PDSN to an associated Base Station (BS) that provides radio links to one or more mobile stations. The interface entity further transfers packet data incoming from the mobile stations (via the BS) to the PDSN. In cdma2000 network standards, the interface entity is referred to as a Packet Control Function (PCF).

The first time a mobile station connects to the PDSN it establishes a packet data connection with it. Once the mobile station has made this connection to the PDSN, the mobile station remains logically connected to it—subject to timeouts and other resource controls—even though user traffic links between the PCF and BS and radio links to the mobile station may be set up and torn down as needed to support the mobile station's data activity. Processing efficiency and improved packet data service is gained by retaining the mobile station's packet data connection within the network even when none of the more "precious" radio link resources are allocated to the mobile station.

With the above connection scheme, the PDSN transfers incoming packet data for a given mobile station to the PCF on the corresponding data connection(s) maintained between the PDSN and the PCF. The PCF is responsible for managing the packet-data "states" of the data-connected mobile stations by tracking whether each mobile station is "active" or "dormant." Here, the term dormant broadly connotes a mobile station having no allocated radio links and no allocated PCF-to-BS links to support packet data transfer, although radio links still can be allocated for other services, such as voice calls Because the typical PDSN or like entity has no knowledge regarding the actual availability of its logically connected mobile stations, it simply transfers incoming packet data to the PCF for delivery to the individually targeted mobile stations. The PCF is left to determine whether a targeted mobile station is active or dormant and, if dormant, to undertake operations to establish radio links to it for delivery of the data. Buffering the transferred data while waiting for the radio connection thus represents a key PCF function.

If a radio connection cannot be established for the mobile station, the PCF is unable to deliver the data transferred to it from the PDSN. However, because the PDSN is unaware of the radio connection status or, in general, the availability of the mobile station, that failure often does not prevent the PDSN from continuing its transfer of data to the PCF for delivery to the unavailable mobile station. Such repeated transfers can lead to network inefficiencies by requiring the PCF to repeat its buffering and delivery attempt operations for a mobile station that is at least temporarily unavailable. Further, such failed delivery attempts can lead to billing/accounting errors in terms of unrecognized data delivery failures.

SUMMARY OF THE INVENTION

The present invention comprises a method and apparatus to support data connection flow control between a Packet Core Network (PCN) and a Radio Access Network (RAN). An exemplary flow control method comprises receiving packet data at the RAN for delivery to a mobile station having an established data connection with the wireless communication network, determining that the mobile station presently is unavailable for delivery of the data, and requesting that flow control be turned on for the mobile station by sending a first flow control message from the RAN to the PCN requesting that the PCN stop sending packet data to the RAN for the mobile station. That action stops the PCN from futilely continuing to transfer undeliverable data to the RAN and from subsequently transferring any new incoming packet data for as long as flow control is turned on for the mobile station.

However, the PCN may retain the mobile station's data connection(s) even after turning on flow control. Thus, an exemplary method further comprises, if the mobile station becomes available again before the PCN drops its data connection(s), sending a second flow control message from the RAN to the PCN indicating that the PCN may resume sending packet data as needed to the RAN for the mobile station. Therefore, the present invention provides a method of selectively marking or otherwise flagging data connections at the PCN that are associated with mobile stations that, for one or more reasons, at least temporarily are unavailable for delivery of packet data from the PCN and unmarking those connections after the mobile stations return to availability. One or more entities in the RAN may maintain similar flags for identifying flow-controlled mobile stations.

Thus, in one embodiment, the present invention comprises a flow control method for use in a wireless communication network wherein a Packet Core Network (PCN) supports data connections with one or more mobile stations, and wherein the packet core network transfers data as needed to a Radio Access Network (RAN) for delivery to individual ones of the mobile stations. In this context, the method comprises receiving a flow control on message at the PCN from the RAN indicating that flow control should be turned on for a mobile station, turning flow control on for data connections associated with the mobile station and thereby suspending packet data transfers from the PCN to the RAN on those data connections. The method further comprises receiving a flow control off message at the PCN from the RAN indicating that flow control should be turned off for the mobile station, and turning flow control off for the data connections associated with the mobile station, thereby resuming packet data transfers as needed from the PCN to the RAN on those data connections.

An exemplary wireless communication system comprises a PCN and a RAN, wherein the PCN includes a Packet Data Serving Node (PDSN) and the RAN includes a Packet Control Function (PCF), which may be associated with or integrated in a Base Station (BS) also included in the RAN. The PCF routes packets between mobile stations supported by the RAN and the PDSN, and may provide packet-buffering functions for data to be delivered to the mobile stations. In turn, the PDSN provides packet routing to the PCF, and may provide gateway routing to external packet networks, such as the Internet, in addition to offering other network or vendor specific features.

In an exemplary embodiment of the present invention, the PCF sends messages as needed to the PDSN requesting that the PDSN turn on (or turn off) flow control for established data connections based on whether a given mobile station is or is not available for delivery of data from the PDSN. Thus, the PCF may request that flow control be turned on for a given mobile station responsive to receiving data from the PDSN for that mobile station and determining that the data cannot currently be delivered to the mobile station. In turn, responsive to determining that the mobile station has become available again, the PCF may request that the PDSN turn off the previously invoked flow control for that mobile station's data connection(s).

In an exemplary embodiment wherein the network operates according to IS-2001 Inter-Operability standards, the PCF sends "flow control on" messages as A11-Registration Request messages that include a flow control indication, e.g., a Normal Vendor Specific Extension (NVSE) value included in the message that serves as a data off indicator. Further, the PCF sends "flow control off" messages as A11-Registration Request messages that do not include the flow control indication. In other words, the exemplary PDSN is configured to recognize the absence of the flow control indication in an A11-Registration Request message for a flow-controlled mobile station as an implicit signal to turn flow control off for that mobile station.

Further, the PCF may be supplied with data from the PDSN, for example, indicating which ones of data connections being supported by it correspond to "always on" mobile stations, and generate flow control messages (flow control on, flow control off) as needed for just those connections. But more broadly, the PCF may generate flow control messages for flow controlling any data connection corresponding to a mobile station that is not available to receive that data. For example, the PCF may request that the BS attempt to set up a traffic channel for the mobile station and determine whether radio service for the mobile station is established responsive to that request. More generally, the PCF may determine whether a mobile station is unavailable for delivery by cooperating with one or more other entities in the RAN.

For example, the PCF may receive indications of mobile station availability from the BS based on signaling from a Mobile Switching Center (MSC). In one embodiment, the MSC is configured to send notifications to the BS regarding mobile station registration events, which serve as indications of availability. The MSC can be configured to send registration notifications for any mobile station that has a dormant packet data connection. Further, the MSC can be configured to infer that flow control has been invoked for any mobile station that fails to respond to attempted packet data re-activation. As such, the MSC can store logic flags or other flow control indicators and send return-to-availability notifications to the BS specifically for flow-controlled mobile stations. More generally, the MSC can be configured to send notifications of registration events for all mobile stations irrespective of whether or not they are flow-controlled. Broadly, the MSC, BS, and PCF all can be configured as needed to implement the rule that flow control should be turned off where the mobile station registers with the network or originates a call.

Rather than passively waiting on such notifications to be received through the BS, the PCF can actively monitor for a mobile station's return to availability and thereby potentially shorten the time that flow control is turned on for that mobile station. For example, once flow control is turned on for a mobile station, the PCF can cause the network to actively "ping" the mobile station by sending a service request for the mobile station to the BS, requesting the BS to setup a traffic channel for the mobile station. In turn, that request, sent as an A9-BS Service Request, causes the BS and associated MSC to page the mobile station. If the mobile station timely responds, the PCF receives an A9-BS Service Response message from the BS, or like message indicating a successful paging response.

An alternative method for the PCF to "ping" the mobile station is that the PCF sends a short data burst to the BS. The short data burst is sent from the PCF via an A9-Short Data Delivery message to the BS, which causes the BS to send a short data burst to the mobile station directly, or indirectly with cooperation from an associated MSC. If the mobile station timely responds, the PCF receives an A9-Short Data Ack or like message indicating a successful short data burst delivery to the mobile station, thus its return to availability. The PCF may maintain an interval timer or other periodic control to periodically initiate a re-paging or sending of short data bursts to a flow-controlled mobile station. Thus, the present invention provides both passive and active mechanisms for turning off flow control once it has been turned on for a given mobile station.

Those skilled in the art will recognize other features and advantages of the present invention upon reading the following description, and upon viewing the associated figures. Of course, the following details should not be construed as limiting the present invention.

DETAILED DESCRIPTION OF THE INVENTION

The present invention is described at various points in the below discussion in the context of cdma2000-based networks. However, it should be understood that the present invention's exemplary flow controls can be applied in other types of wireless communication networks, such as those based on Wideband (W-CDMA) standards for example.

Figure 1:
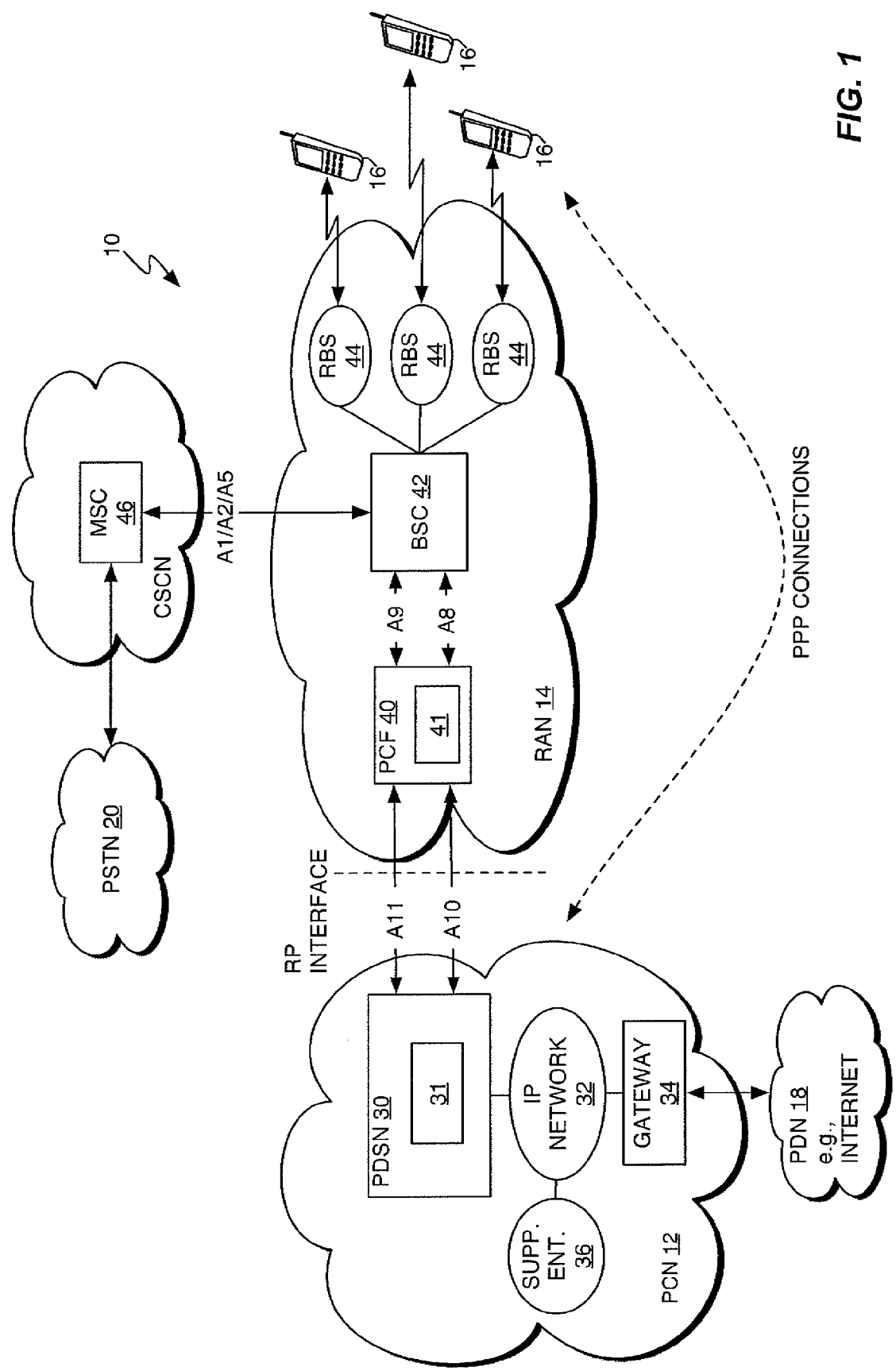
FIG. 1 is a diagram of an exemplary wireless communication network in which the present invention may be embodied.

Turning to the drawings, FIG. 1 illustrates an exemplary wireless communication network 10, which may be configured as a cdma2000 wireless network. Network 10 comprises a Packet Core Network (PCN) 12 and a Radio Access Network (RAN) 14 that support communication between users of mobile stations 16 and various external networks, such as one or more Public Data Networks (PDNs, e.g., the Internet) 18 and the Public Switched Telephone Network (PSTN) 20.

PSTN support is not material with respect to supporting the present invention, which focuses on packet data operations.

An exemplary PCN 12 comprises a Packet Data Serving Node (PDSN) 30 (including a flow controller 31), an IP network 32, an optional gateway router 34, and one or more supporting entities 36 (authentication, foreign agent, etc.). An exemplary RAN 14 comprises a Packet Control Function (PCF) 40 (including flow controller 41), a Base Station (BS) comprising a Base Station Controller (BSC) 42 and associated Radio Base Stations (RBSs) 44.

Figure 2:
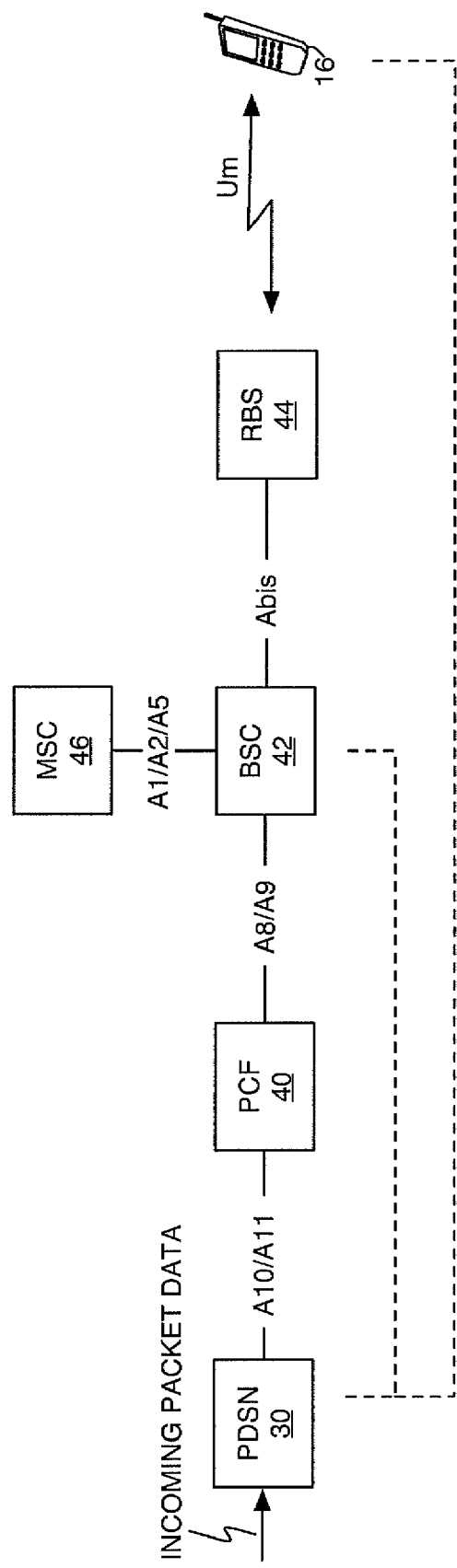
FIG. 2 is an exemplary diagram of data and related connections in the wireless communication network.

FIG. 2 provides a basis for discussing exemplary network connections and associated functions that support mobile station packet data communications. The BSC 42 is connected to the MSC 46 in the Circuit-Switched Core Network (CSCN) via an A1/A2/A5 interface, to the PCF 40 via an A8/A9 interface, and to the RBSs 44 via an Abis interface. MSs 16 are connected to the RBSs 44 via the Um interface—i.e., the "air interface" as defined in this example by the IS-2000 standards. It should be noted, however, that the present invention is applicable to a variety of network standards.

The PCF 40 is connected to the PDSN 30 via an A10/A11 interface. As noted, PCF 40 provides the RAN-to-PDSN interface known as the RP or A10/A11 interface. (IS-2001 defines the RP interface as two separate interfaces: the A10 interface, which carries user data—packet data for targeted MSs 16—and the A11 interface, which carries signaling data for control of the packet data connections.) PCF 40 is responsible for managing the packet-data states (active, dormant) of data-connected MSs 16, relaying packets between the MSs 16 and the PDSN 30, and buffering data received from the PDSN 30 as needed for delivery to dormant MSs 16. Of course, PCF 40 may perform other functions but of particular interest with regard to the present invention, the PCF 40 provides flow control messaging to the PDSN 30, which may be used by PDSN 30 temporarily to suspend packet data transfers to PCF 40 for dormant (unavailable) MSs 16.

According to terminology adopted herein, PCF 40 sends "first" flow control messages to turn on flow control for selected mobile stations 16 (flow control on=data transfers off), and sends "second" flow control messages to turn off flow control as appropriate (flow control off=data transfers on). These first flow control messages also are referred to herein as "flow control on" messages, and the second flow control messages are referred to as "flow control off" messages. It should be understood that these flow control messages and the attendant flow control operations of PDSN 30 and PCF 40 are network-based flow control actions independent of any higher layer flow controls, such as those enforced by whatever TCP/IP or other types of applications the mobile stations may be running. It also should be understood that, as is explained herein, that implicit as well as explicit flow control on/off signaling may be used.

To better understand flow control operations, exemplary connection setup details may be helpful. In an exemplary embodiment, to set up a packet-data call, a point-to-point protocol (PPP) session first must be established between PDSN 30 and a mobile station 16. The first time a particular mobile station 16 connects to PDSN 30, it establishes the connection via a packet-data call. After establishing a PPP connection with the PDSN 30, the mobile station 16 remains connected to network 10 (subject to timeouts and various other connection controls). Mobile station 16 or PDSN 30 may initiate subsequent data transmissions over the PPP connection.

Therefore, network 10 maintains the data connection for mobile station 16 even when the mobile station is not engaged in active packet data communications. For example, connection resources may remain allocated on the A10/A11 interfaces between the PDSN 30 and PCF 40. The retention of data connections during periods of inactivity by the mobile station 16 may be controlled by time-outs, or other call teardown controls. Some or all of the mobile stations 16 may be considered to be "always on" devices, which are intended to remain connected to the network 10 and for which call teardown should be initiated by the PDSN 30 or the always on mobile station 16, rather than by the PCF 40. Even in the general case of a connected mobile station, it generally is preferable to defer data connection teardown operations to the PDSN 30 rather than the PCF 40 because the PCF 40 serves as an intermediate entity regarding these mobile station data connections.

However, because the radio resources at RBSs 44 typically represent a "scarce" system resource, a connected mobile station 16 is allocated radio links as needed to support its actual packet data communications. Therefore, even though its PDSN/PCF data connections are maintained, the radio links to a connected mobile station 16 may be setup and torn down repeatedly over a period of time based on whether the mobile station 16 is or is not sending or receiving packet data.

It is possible, even likely, that PCF 40 will at some point receive data from PDSN 30 for delivery to a dormant mobile station 16, which requires re-activation for successful delivery of the data to it. More generally, PCF 40 may receive packet data on a data connection targeted to a logically connected mobile station 16 that is unavailable for delivery of packet data. Such unavailability may arise because the mobile station 16 is busy in another service that does not permit concurrent delivery of packet data (or where the network 10 or mobile station 16 in general do not support concurrent services), or may arise because the mobile station 16 is out of radio coverage, e.g., in a radio shadow. Absent the present invention, the attempt by PCF 40 to deliver the data transferred to it by PDSN 30 fails due to the unavailability of mobile station 16 but PDSN 30 is not apprised of that unavailability and may repeatedly try to deliver the same or additional data, leading to potential network inefficiency and data delivery accounting problems.

To address the aforementioned resource inefficiency and accounting discrepancy issues, RAN 14 implements a flow control scheme whereby it provides PCN 12 with information regarding the unavailability, i.e., no delivery of packet data is possible because of fading, busy state, etc., of connected mobile stations. An exemplary embodiment of the present invention comprises a simple flow control scheme for always on or other mobile stations 16 that stops (suspends) the transfer of data from the PDSN 30 to the PCF 40 if a mobile station is unreachable or otherwise unavailable. The method may include procedures whereby the PCF 40 initiates (periodic) re-paging of the mobile station 16 to determine when it becomes available again, or it may receive such indication indirectly from the MSC 46 via the BSC 42. However determined, the PCF 40 recognizing that a flow-controlled mobile station 16 has again become available triggers it to notify the PDSN 30 so that PDSN 30 can turn flow control off for the mobile station 16 and thereby resume transferring packet data to the PCF 40 for the mobile station 16 on an as-needed basis.

An initial step in an exemplary embodiment comprises identifying at the PCF 40 those data connections that are associated with always-on devices. The PCF 40 may exchange information with PDSN 30 at session setup to accomplish this operation. In particular, as part of the packet data call setup procedure the PDSN 30 may send an indication regarding the "always on" status of a mobile station 16 to the PCF 40 via a NVSE value in the A11 Session Update message sent to the PCF 40. The PCF 40 would then store that information as long as that mobile station's A10 data connection exists. The PCF 40 would perform flow control as needed for all such connections. Additionally, the always-on connection status can be indicated in an A11-Registration Reply Message.

Figure 3:
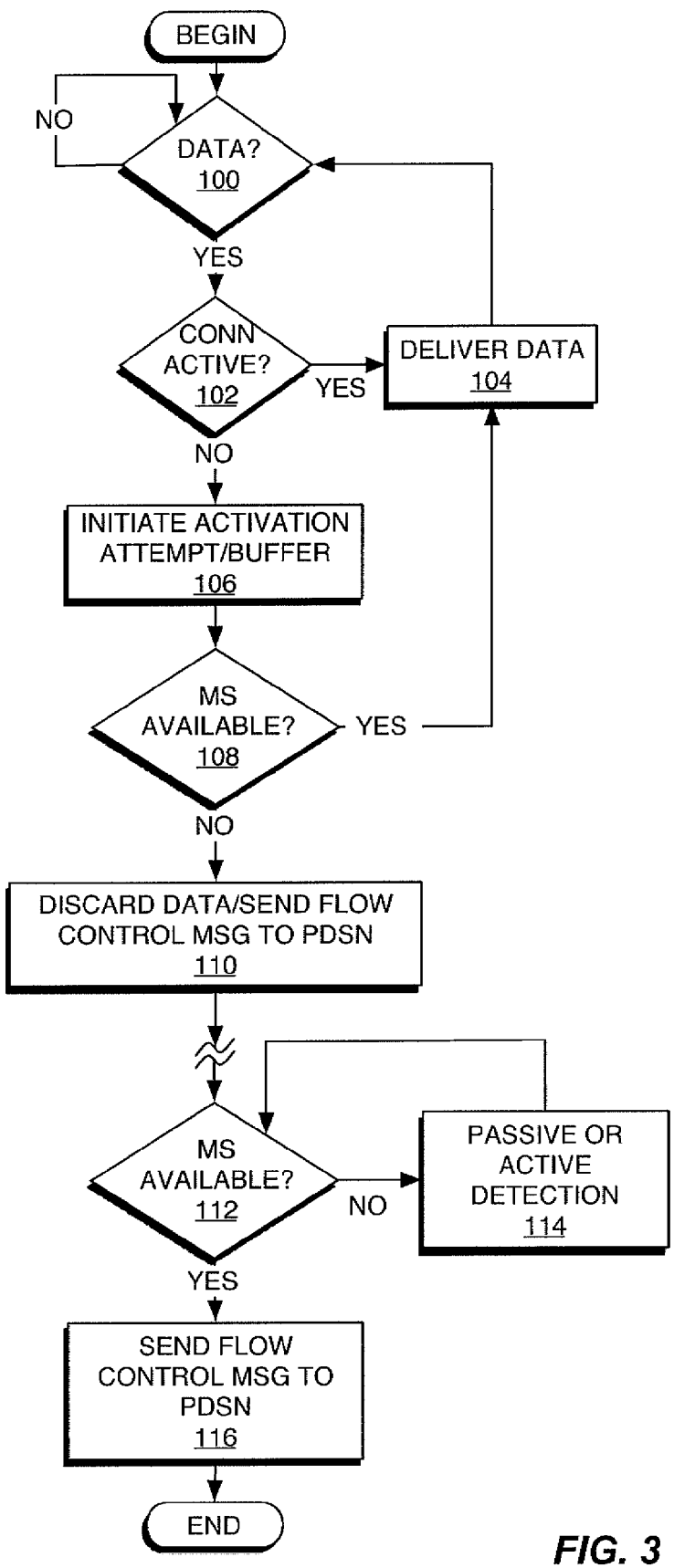
FIG. 3 is a diagram of exemplary processing logic for one or more embodiments of the present invention.

More broadly, PCF 40 can apply flow control to any data connection for which the associated mobile station becomes unreachable. FIG. 3 steps through exemplary processing logic, which may be implemented as hardware, software, or both, at PCF 40 and particularly at flow controller 41. Effectively, FIG. 3 outlines an exemplary method whereby the PCF 40 invokes flow control, i.e., requests that the PDSN 30 turn flow control on for mobile stations 16 that are deemed unavailable, and clears flow control, i.e., requests that the PDSN 30 turn flow control off, upon determining that a flow-controlled mobile station 16 has become available again.

Assuming that a data connection exists for a given targeted mobile station 16, processing begins with PCF 40 monitoring for receipt of data from PDSN 30 for delivery to the targeted mobile station 16 (Step 100). If data is received and the mobile station's connection is active (Step 102), PCF 40 delivers the data to the mobile station via BSC 42/RBSs 44 (Step 104). If, however, no radio links currently are allocated to the targeted mobile station's data connection, PCF 40 initiates an activation attempt by requesting a service connection to the associated BSC 42 and meanwhile buffers the data transferred in from PDSN 30 (Step 106). If the mobile station 16 is activated (Step 108), PCF 40 proceeds with the data transfer. If PCF 40 determines that the mobile station 16 is unavailable, e.g., the mobile station 16 is busy or no radio link for packet data transfers could be established to it, then PCF 40 sends a flow control on message to the PDSN 30 (Step 110) and may discard the buffered data.

In an exemplary embodiment, the PCF 40 can invoke flow control for the unavailable mobile station 16 by sending an A11-Registration Request message to the PDSN 30 that includes a flow control indication. PCF 40 can be configured to include such indication by setting a NVSE value in the message to indicate that the PDSN 30 should turn flow control on for the mobile station 16. Thus, sending this first flow control message to the PDSN 30 provides it with notification that the targeted mobile station 16 is unavailable for delivery of the packet data.

From the network's perspective, notifying the PDSN 30 as to the mobile station's unavailability is preferable to the PCF 40 tearing down the A10/A11 data connection for the mobile station 16. That is, PCF 40 acts as an intermediate transport link in the logical end-to-end session connection between mobile stations 16 and the PDSN 30. As such, it is better to allow the PDSN 30 to suspend transfers on the connection and, ultimately, make the decision to tear the connection down if warranted. Of course, the present invention does not prohibit teardown of the data connections by PCF 40 if desirable.

Regardless, after invoking flow control at PDSN 30 for the unavailable mobile station 16, which thereby suspends subsequent data transfers from the PDSN 30 for that mobile station 16, PCF 40 can monitor for the mobile station's return to available status (Steps 112 and 114). Monitoring can be passive or active. In the active case, PCF 40 is configured to determine whether the flow-controlled mobile station 16 has returned to availability by, for example, periodically initiating pages of the mobile station or sending short data bursts to the mobile station. In the case of paging, PCF 40 may initiate paging by sending one or more A9-BS Service Request messages to BSC 42. In the case of sending short data bursts, PCF 40 may initiate the bursts by sending one or more A9-Short Data Delivery messages to BSC 42.

In the passive case, PCF 40 is configured to wait for an indication from BSC 42 as to when a flow controlled mobile station 16 has returned to availability. This indication can be in the form of a registration event or an origination event. For the former case, MSC 46 provides an indication of the registration event to the BSC 42, which in turn provides notification to PCF 40.

For an origination event as part of call setup, the BSC 42 sets up a bearer path to the PCF 40, which is interpreted by PCF 40 as an implicit notification that the mobile station 16 is available. That is, for origination events, whether associated with dormant handoff or with a data transfer to the network 10, BSC 42 initiates setup of an A8 connection between it and PCF 40 based on sending an A9-Setup-A8 message to the PCF 40 responsive to an origination event. PCF 40 can then forward a corresponding A11-Registration Request message. The absence of a "data off" NVSE value in that registration message results in the PDSN 30 turning off flow control for the associated mobile station 16. Thus, the flow control off indicator is indicated implicitly by the absence of any flow control on indication in the message.

Note that for a registration event, MSC 46 can send an indication in a Location Update Accept message to inform BSC 42 that a mobile station 16 with a dormant packet data session has registered, and the BSC 42 can then forward this to the PCF 40, which then sends a corresponding A11-Registration Request message to the PDSN 30 to turn flow control off for the mobile station 16. In another type of event, packet data re-activation is requested for a busy mobile station 16 under circumstances where concurrent services are not supported. In such cases, as part of the call clearing process (clear command) for the service the mobile station 16 was engaged in, the MSC 46 can send an indication to the BSC 42 that the mobile station 16 has returned to availability for packet data delivery.

In an exemplary embodiment, MSC 46 can be configured to infer that flow control is invoked for any mobile station 16 that does not (or cannot) respond to an attempt to re-activate its dormant packet data connections, e.g., it is busy in circumstances that preclude concurrent services or it is out of radio coverage. Thus, MSC 46 can be configured to store logical flags indicating which ones of the mobile stations 16 it is supporting are flow controlled, and can be programmed to send re-registration notification messages to BSC 42 for just those mobile stations 16, or for all mobile stations 16, whether or not they are marked as flow controlled.

Regardless, if PCF 40 determines that a flow-controlled mobile station 16 has become available again, it requests that PDSN 30 turn off flow control for that mobile station by sending a flow control off message to PDSN 30 (Step 116). That flow control message can comprise another A11-Registration Request message wherein the flow control indication (e.g., NVSE value) is omitted. That is, PDSN 30 can be configured such that receipt of an A11-Registration Request message that does not include the flow control indication is interpreted as a request to turn flow control off for the corresponding mobile station 16. Alternatively, it may be desirable in some embodiments to configure the PDSN 30 to look for an explicit indication that flow control should be turned off.

Figure 4:
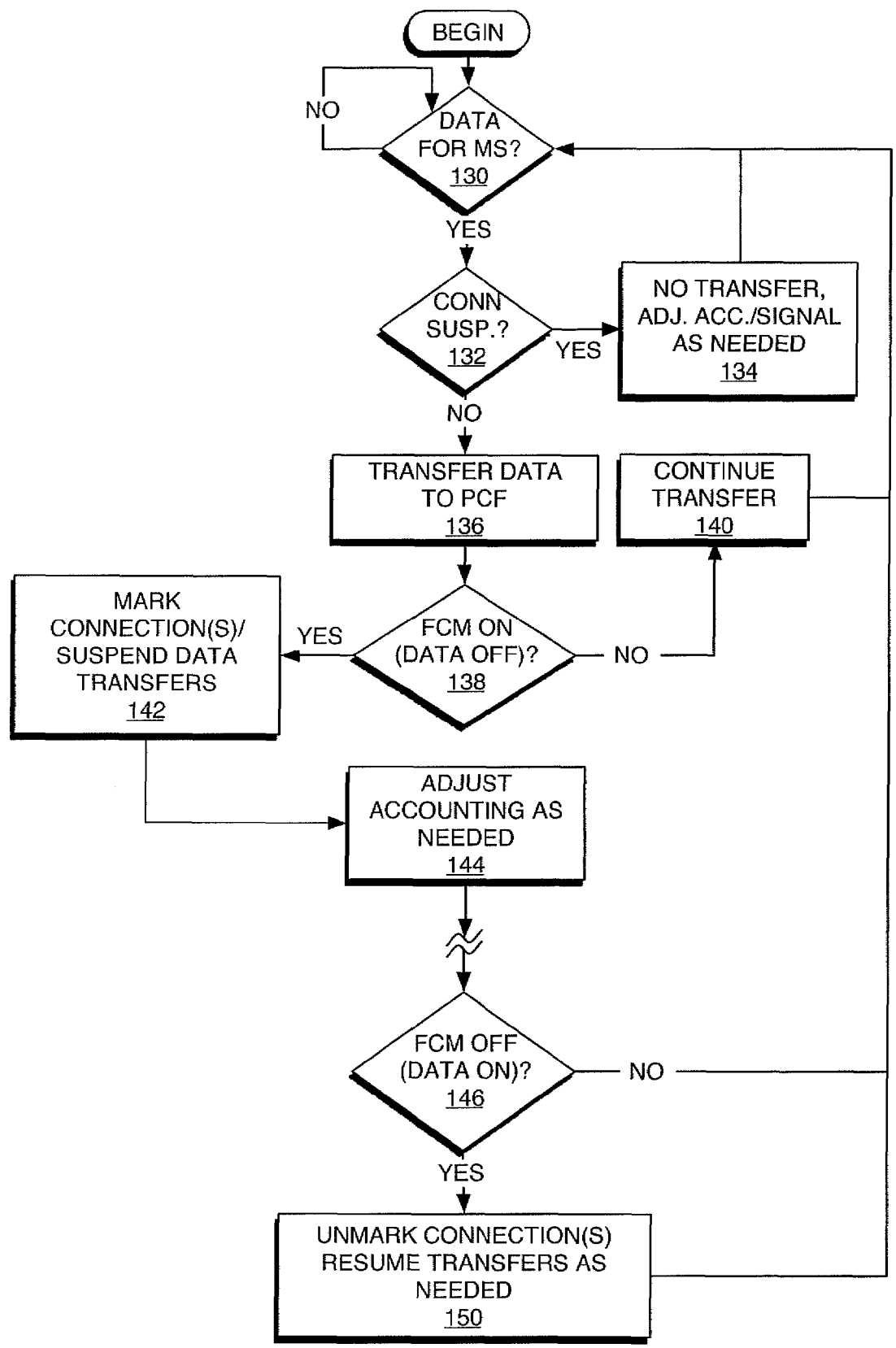
FIG. 4 is a diagram of exemplary processing logic for one or more embodiments of the present invention.

FIG. 4 steps through exemplary, complementary PDSN processing logic, which may be implemented as hardware, software, or both, at PDSN 30 and particularly at flow controller 31. Assuming that a data connection exists for a given mobile station 16, processing begins with PDSN 30 monitoring for receipt of data for delivery to it (Step 130). If packet data is received for the targeted mobile station 16, the PDSN 30 checks whether the mobile station's connection is marked as suspended, i.e., marked as being flow-controlled (Step 132). If so, PDSN 30 does not transfer the data to PCF 40. Note that this allows the PDSN 30 to avoid accounting errors that might otherwise arise from lost data associated with a failed delivery attempt. Thus, PDSN 30 additionally may signal a sending entity and adjust data delivery accounting as needed to reflect non-delivery of the data (Step 134). Enforcing the flow control also avoids the inefficiency incurred in conventional networks wherein the data would be blindly delivered to the PCF for attempted delivery without any awareness of whether the mobile station was or was not available.

On the other hand, if flow control is not turned on for the targeted mobile station's connection, PDSN 30 transfers the data to PCF 40 for delivery to the mobile station 16 (Step 136). Since the attempt to deliver the data just transferred to the PCF 40 could trigger a determination of unavailability by the PCF 40, PDSN 30 monitors for receipt of a first flow control message from PCF 40 (Step 138). If no such message is received, PDSN 30 continues data transfer as needed (Step 140) and processing continues.

If, however, PDSN 30 does receive a flow control on message from PCF 40, it marks the data connection as suspended and suspends the current data transfer on that connection (Step 142). Additionally, PDSN 30 adjusts its packet data accounting as needed to account for the non-delivery of the just transferred data (Step 144). Once the mobile station's connection is marked as flow-controlled, PDSN 30 will not undertake subsequent data transfers on that connection.

In some network standards, such as IS-2000, the PPP connection (data session) established for a given mobile station 16 can support multiple packet data service instances, i.e., the mobile station 16 may be associated with multiple A10 traffic connections, each supporting a different packet data flow over the same PPP connection. According to one or more exemplary embodiments of the present invention, the PDSN 30 suspends data transfer on all A10 connections associated with a mobile station 16 when it invokes flow control for that mobile station 16.

Once the PDSN 30 invokes flow control for a particular mobile station 16, it monitors for the subsequent receipt of a second flow control message (flow control off) for that mobile station 16 indicating that data transfer attempts are once again permitted for the mobile station 16 (Step 146). PCF 40 sends such flow control off messages responsive to determining that a flow-controlled mobile station has become available again. If PDSN 30 receives such a message from PCF 40 for a flow-controlled mobile station, it clears the corresponding marked connections, i.e., lifts the suspension of data transfer from them, and processing continues as needed (Step 150).

Figure 5A:
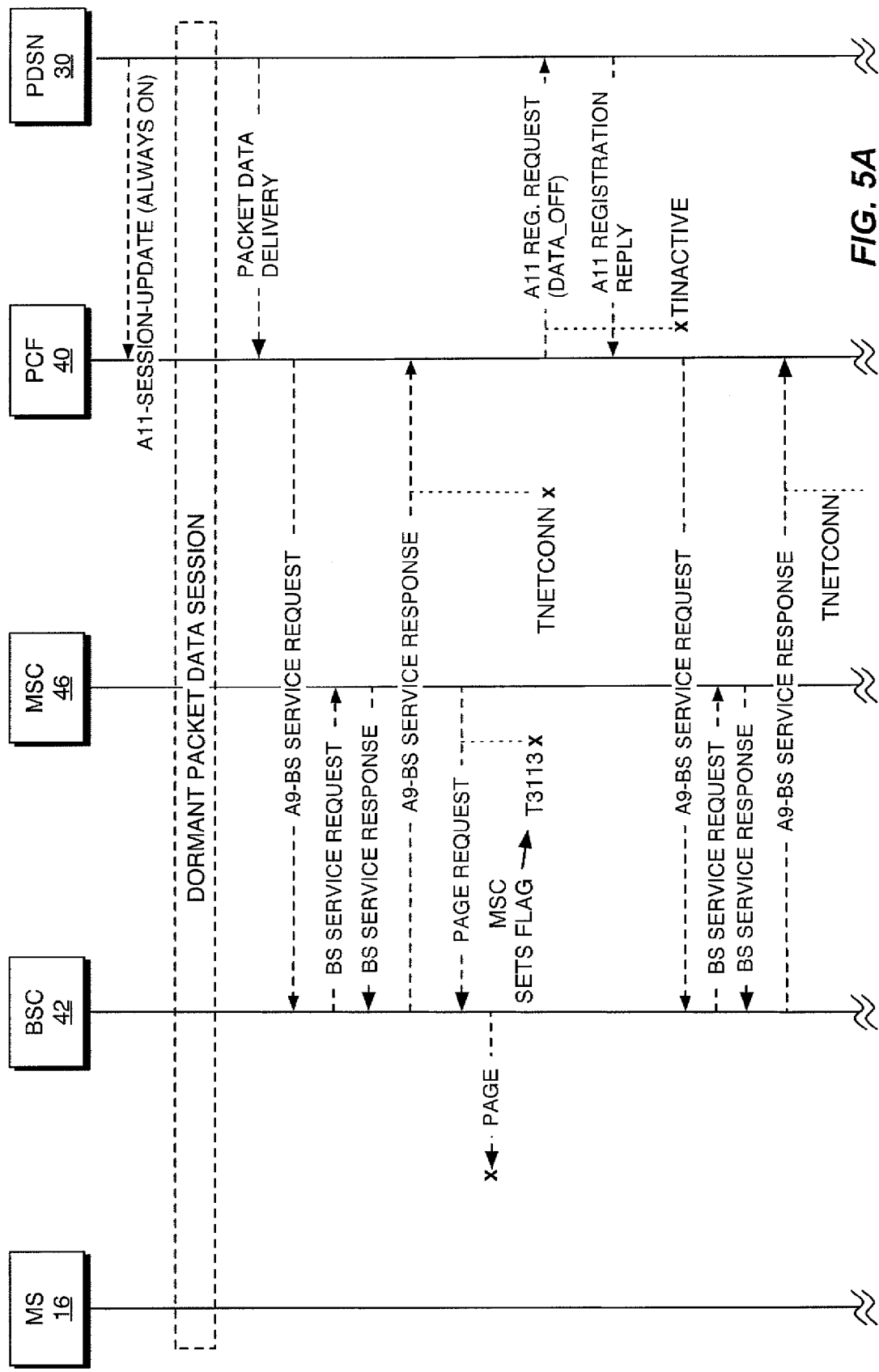
FIGS. 5A, 5B, 6A, 6B, 7A and 7B are exemplary call timing diagrams illustrating inter-entity messaging supporting one or more embodiments of exemplary flow control.
Figure 5B:
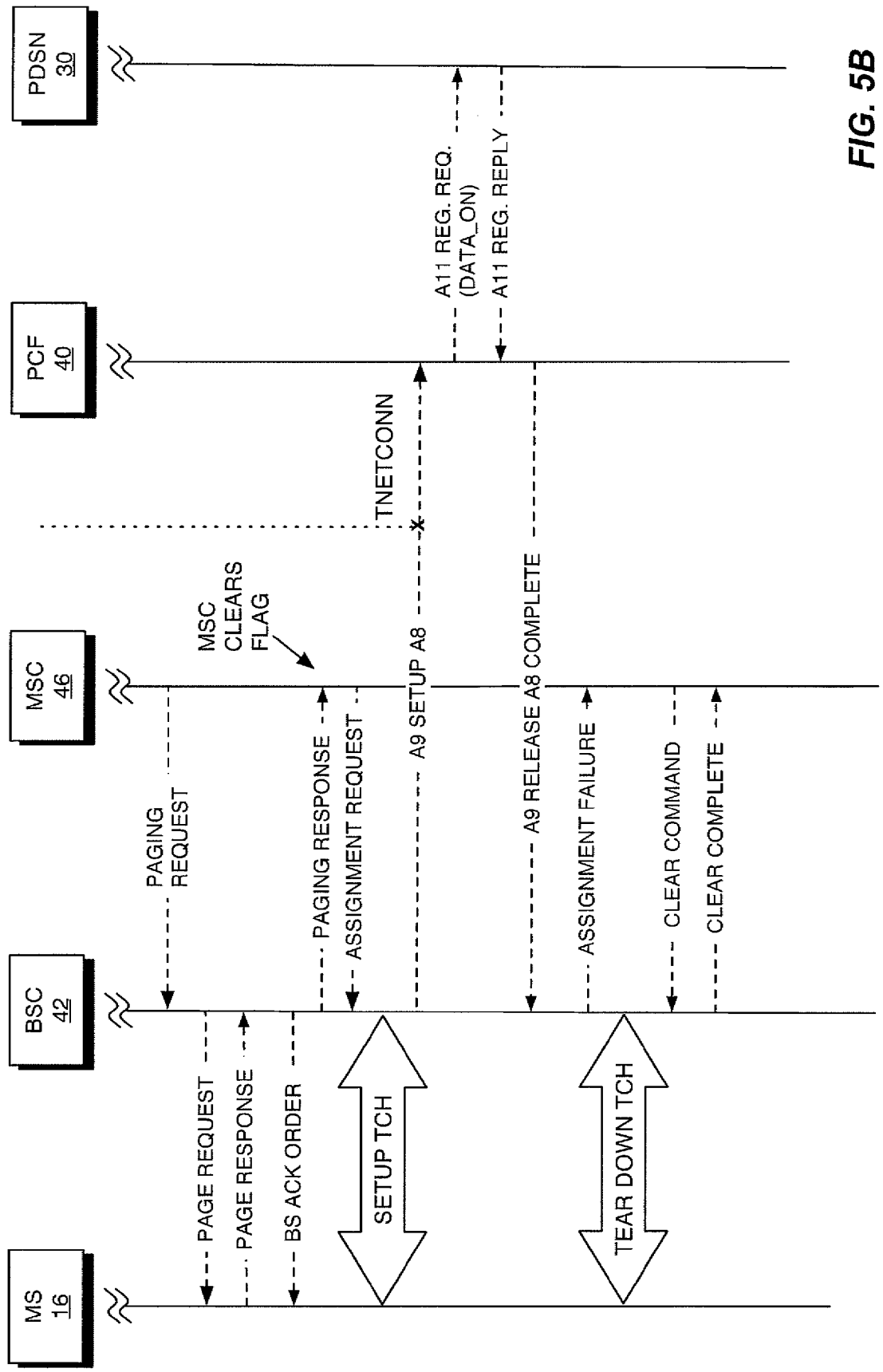

FIGS. 5A and 5B illustrate exemplary network signaling performed by the various entities in support of one or more exemplary embodiments of the present invention. In the diagrammed steps, one sees that data incoming to PDSN 30 is targeted to a mobile station 16 having an established data connection with PDSN 30. The connection may be dormant but flow control has not been turned on for it. PDSN 30 thus transfers the data to PCF 40 for delivery to the targeted mobile station 16. That data transfer causes PCF 40 to send an A9-BS Service Request to its associated base station (e.g., to BSC 42). In turn, BSC 42 sends a BS Service Request to the supporting MSC 46, which acknowledges with a return BS Service Response.

BSC 42 sends an A9-BS Service Response to PCF 40 after receiving the response from MSC 46, which tells PCF 40 that activation of the targeted mobile station 16 has been initiated. PCF 40 thus starts a timer ($T_{NETCONN}$) that it uses to determine whether the targeted mobile station 16 timely responds to the re-activation attempt. A short time later, MSC 46 issues a paging request to BSC 42 (responsive to the earlier BS Service Request), and BSC 42 pages the targeted mobile station 16.

If PCF 40 does not receive an indication of successful re-activation of the targeted mobile station 16 before expiration of its $T_{NETCONN}$ timer, it deems the mobile station 16 as unavailable and requests that PDSN 30 invoke flow control for the mobile station 16 by sending a first flow control message in the form of an A11-Registration Request that indicates data flow at least temporarily should be turned off for the mobile station 16. As noted, the flow control message can comprise an A11-Registration Request message that includes a NVSE indicator or other value indicating that PDSN 30 should turn flow control on for the targeted mobile station 16.

Note, too, MSC 46 may set a flow control flag for the targeted mobile station 16 based on its failure to respond. This function is used in those embodiments where MSC 46 is configured to specifically notify BSC 42 regarding re-registrations received from flow-controlled mobile stations 16. That is, the MSC 46 can use the stored flag to later determine whether it should signal BSC 42 regarding a detected return to availability by the corresponding mobile station 16.

At roughly the same time, assuming that PCF 40 is configured to actively monitor for a return to availability of a flow-controlled mobile station 16, PCF 40 initiates an inactivity timer ($T_{INACTIVE}$) that it uses to time the intervals between which it repeats its activation attempts. Thus, upon expiration of its $T_{INACTIVE}$ timer, PCF 40 sends another A9-BS Service Request to BSC 42, which initiates another round of BSC-to-MSC service requests and, ultimately, results in a second attempt to page the targeted mobile station 16. Note that if the initial A9-BS Service Response returned by BSC 42 contained an indication that the targeted mobile station 16 was busy in another service, i.e., busy in a service that precludes delivery of packet data, then PCF 40 would not run its $T_{NETCONN}$ timer but rather would immediately start its $T_{INACTIVE}$ timer to time its subsequent paging attempt.

In the diagram, the second paging attempt is successful. MSC 46, if so configured, thus clears its flow-controlled status flag for the mobile station 16, and PCF 40 sends a second flow control message (data on) to PDSN 30 to indicate that flow control should be turned off for the targeted mobile station 16 based on its return to availability.

In more detail, if a flow-controlled mobile station 16 responds to a re-paging attempt, BSC 42 sends an A9-Setup-A8 message to PCF 40 for the responding mobile station 16. In turn, PCF 40 requests that PDSN 30 turn off flow control for the mobile station 16 by sending an A11-Registration Request Message without a NVSE flow control value.

In response to receiving the A11-Registration Request Message from PCF 40, the PDSN 30 turns flow control off for the mobile station's data connection(s) and returns an A11-Registration Reply message to PCF 40. If the PDSN 30 has no data to transfer to PCF 40 for delivery to mobile station 16, the returned Registration Reply message includes a DAI set equal to zero. With no data to transfer in from the PDSN 30, PCF 40, recognizing that the connection setup request corresponds to its paging of the mobile station rather than because the mobile station has data to send, releases the call and its associated resources, e.g., it sends an A9-Release-A8 Complete message to BSC 42.

Upon receiving that message, BSC 42 releases any corresponding radio resources that may have been allocated to the mobile station 16. Conversely, if the PDSN 30 does have data for the mobile station 16, it will set the DAI indicator to one (DAI=1) in the A11-Registration Reply message returned to PCF 40 and the PCF 40/BSC 42 proceed with traffic channel setup and data delivery, e.g., the A8 connection is established between PCF 40 and BSC 42, and radio links on the air interface are allocated to mobile station 16 as needed.

Figure 6A:
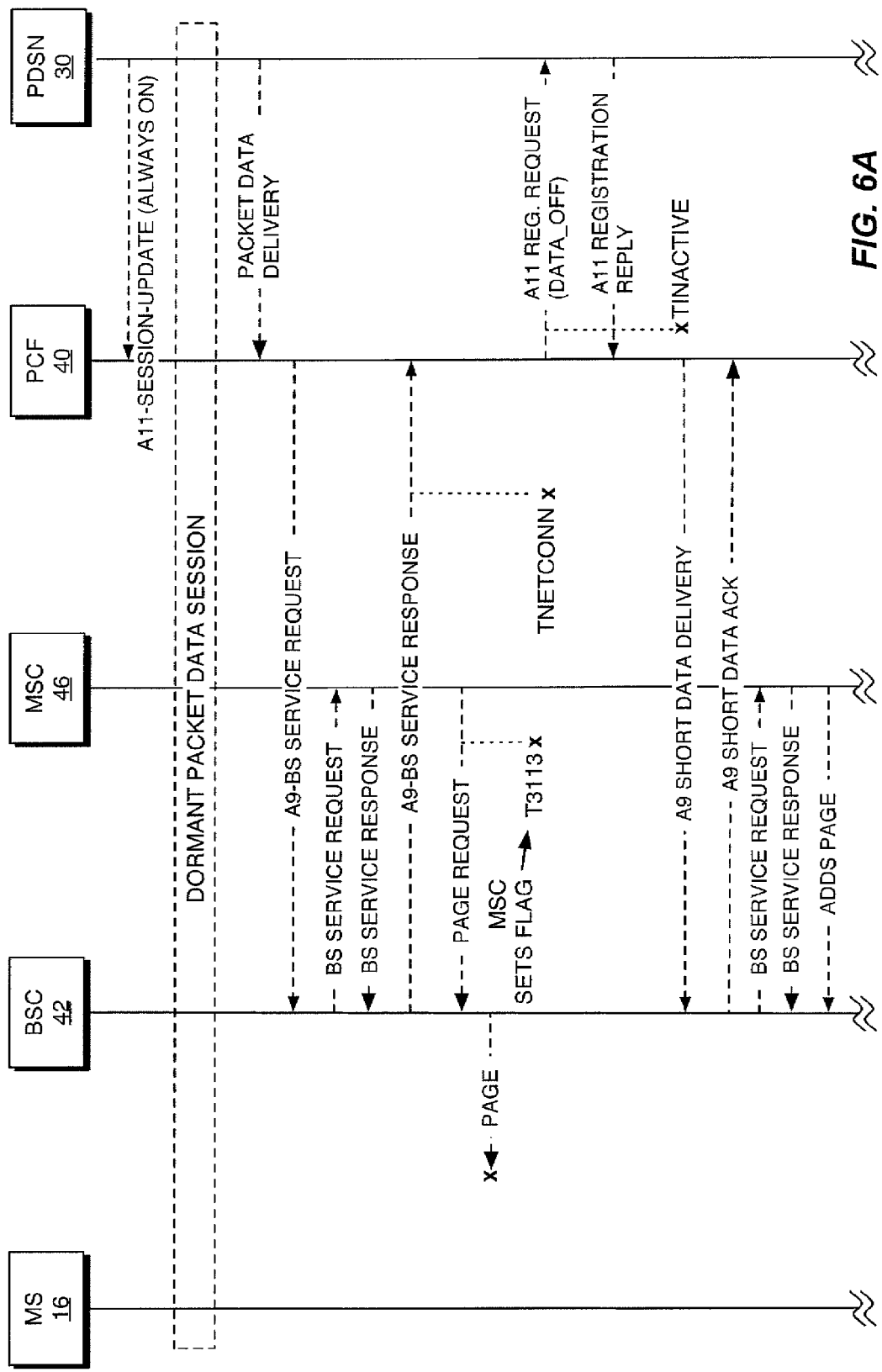
Figure 6B:
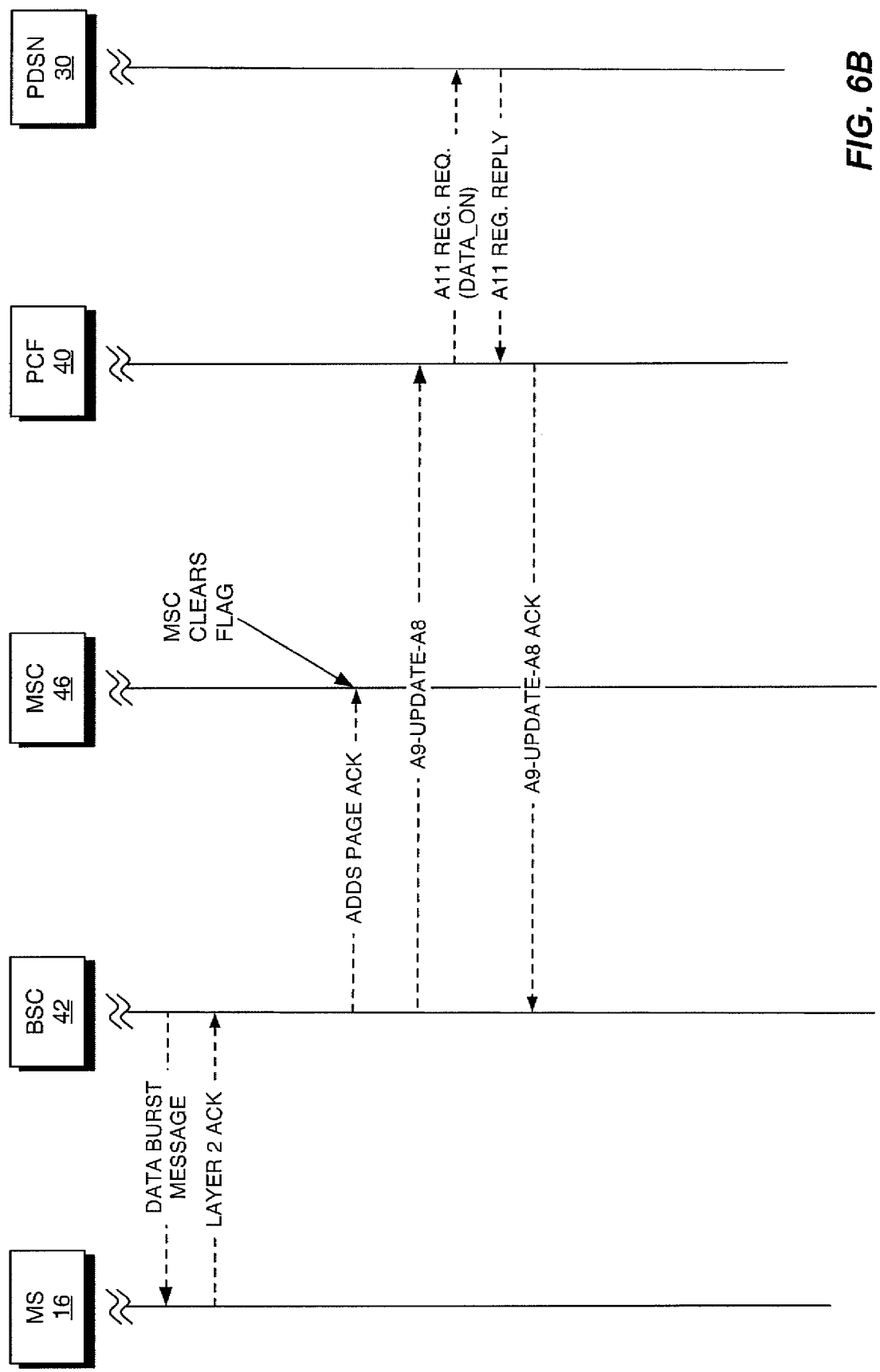

FIGS. 6A and 6B illustrate yet another embodiment according to the present invention. Here, PCF 40 is configured to initiate the sending of short data bursts to flow-controlled mobile stations 16. That is, the return to availability of flow-controlled mobile stations 16 can be detected based on the PCF 40 actively monitoring for them by initiating the sending of short data burst messages to them. PCF 40 initiates an inactivity timer ($T_{INACTIVE}$) that it uses to time the intervals between which it repeats these activation attempts for individual ones of flow-controlled mobile stations 16. Thus, upon expiration of its $T_{INACTIVE}$ timer for a given flow-controlled mobile station 16, PCF 40 sends an A9-Short Data Delivery message to BSC 42. The contents/format of the message can be pre-configured at PCF 40, or dummy values can be used. In turn, upon receipt of the message, the BSC 42 sends an A9 Short Data Ack to the PCF 40. Even though the message may not convey any meaningful information to the mobile station 16, its message receipt acknowledgment back to the BSC 42 provides a positive indication that the mobile station 16 has returned to availability.

Upon receipt of the A9-Short Data Delivery message, the BSC 42 may attempt direct delivery of the data burst message to the mobile station 16. Alternatively, BSC 42 may send a BS Service Request with a short data burst indication and the received values to the supporting MSC, which acknowledges with a return BS Service Response. A short time later MSC 46 issues a short data burst delivery with the values received in the BS Service Request via an ADDS Page message to the BSC 42 (responsive to earlier BS Service Request), and the BSC 42 sends a short data burst message to the targeted mobile station 16.

In the diagram, the short data burst delivery is successful, i.e., even though the data burst message may not convey any meaningful information to the mobile station 16, its data burst message receipt acknowledgment back to the BSC 42 provides a positive indication that the mobile station 16 has returned to availability. Thus, MSC 46, if so configured, clears its flow-controlled status flag for the mobile station 16, and PCF 40 sends a second flow control message (data on) to PDSN 30 to indicate that flow control should be turned off for the targeted mobile station 16. In more detail, if a flow-controlled mobile station 16 responds to the short data burst, BSC 42 sends an A9-Update-A8 to PCF 40 for the responding mobile station 16. In turn, PCF 40 requests that PDSN 30 turn off flow control for the mobile station 16 by sending an A1-Registration Request Message without a NVSE flow control value. In response to receiving the A11-Registration Request Message from PCF 40, the PDSN 30 turns flow control off for the mobile station's data connection(s) and returns an A11-Registration Reply message to PCF 40.

In another scenario, the mobile station 16 has packet data to send to PDSN 30 at a time between the network's re-paging attempts. In this case, the mobile station 16 will send an Origination message with a Data Ready to Send indicator set equal to 1 (DRS=1) to indicate that it has data to send. Upon receiving this indication and noting that flow control is turned on for the originating mobile station 16, the BSC 42/PCF 40 send an A11-Registration Request message to PDSN 30. Because the A-11 Registration Request message omits the flow control on indicator, the PDSN 30 recognizes that flow control should be turned off for the mobile station 16.

Such an implicit notification rule also provides exemplary handling for scenarios arising under the above described mobile station mobility events. For example, flow control might be turned on for a given mobile station 16 while it is in the packet zone service area of a first PCF 40 (termed the "source" PCF). If the mobile station 16 then undergoes a "dormant" (packet data) handoff between the source PCF and a "target" PCF, it will attempt a packet data re-registration through the target PCF.

The target PCF is not aware of the mobile station's flow-controlled status and thus sends a normal mobility-triggered A11-Registration Request message, i.e., no flow control on indicator. Assuming that PDSN 30 controls both the source and target PCFs, it will thus receive the A11-Registration Request message for the mobile station 16 from the target PCF. Recognizing that flow control is turned on for the mobile station, and realizing that the re-registration request means that the mobile station 16 is once again available, PDSN thus turns flow control off even though the message from the target PCF did not explicitly indicate that it should take such action. In other words, flow control may be cleared at the PDSN 30 for a mobile station 16 that undergoes inter-PCF handoff irrespective of whether the source PCF 40 that invoked the flow control ever attempts to clear it.

Thus, in the case of intra-PDSN mobile station dormant handoff, where both the source and target PCFs are attached to the same PDSN, the PDSN establishes a new A10 connection with the target PCF, clears flow control for the mobile station 16, and releases the source side (A10) resources. In response, the source PCF removes all bindings/resources with the released A10 connection. Further, if the source PCF has been carrying on active monitoring/flow control management for the mobile station, it ceases doing so. That is, source PCFs' flow control management and return-to-availability monitoring functions (paging, short message delivery attempts, etc.), are ended responsive to the mobile station's A10 connection being released.

Note that for inter-PDSN dormant handoffs, the source and target PDSN may not coordinate the dormant handoff, and thus the source PDSN may not release the source PCF's A10 connection for the mobile station. In such cases, the source PCF may continue its active monitoring for the mobile station, but such monitoring will be timed-out according to PPP and/or A10 connection timeouts (e.g., inactivity timers). Such timeouts or other implicit notifications thus can be used to cover inter-PDSN and other handoff scenarios and, in general, the PDSN flow controller 32 may be implemented to enforce the rule that anytime an A11-Registration Request Message is received for a given mobile station 16 without a flow control on indication, the PDSN 30 will turn flow control off.

Figure 7A:
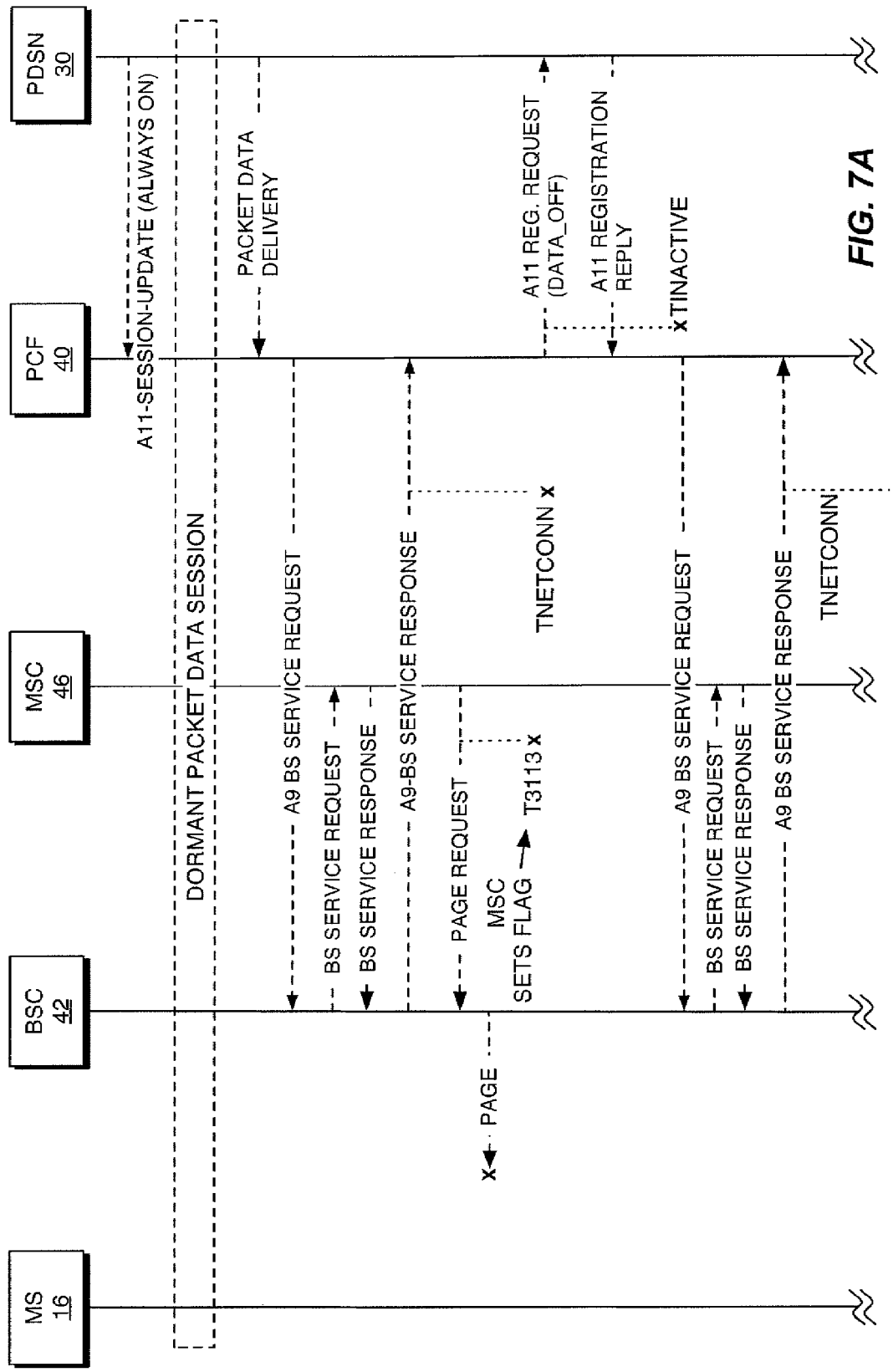
Figure 7B:
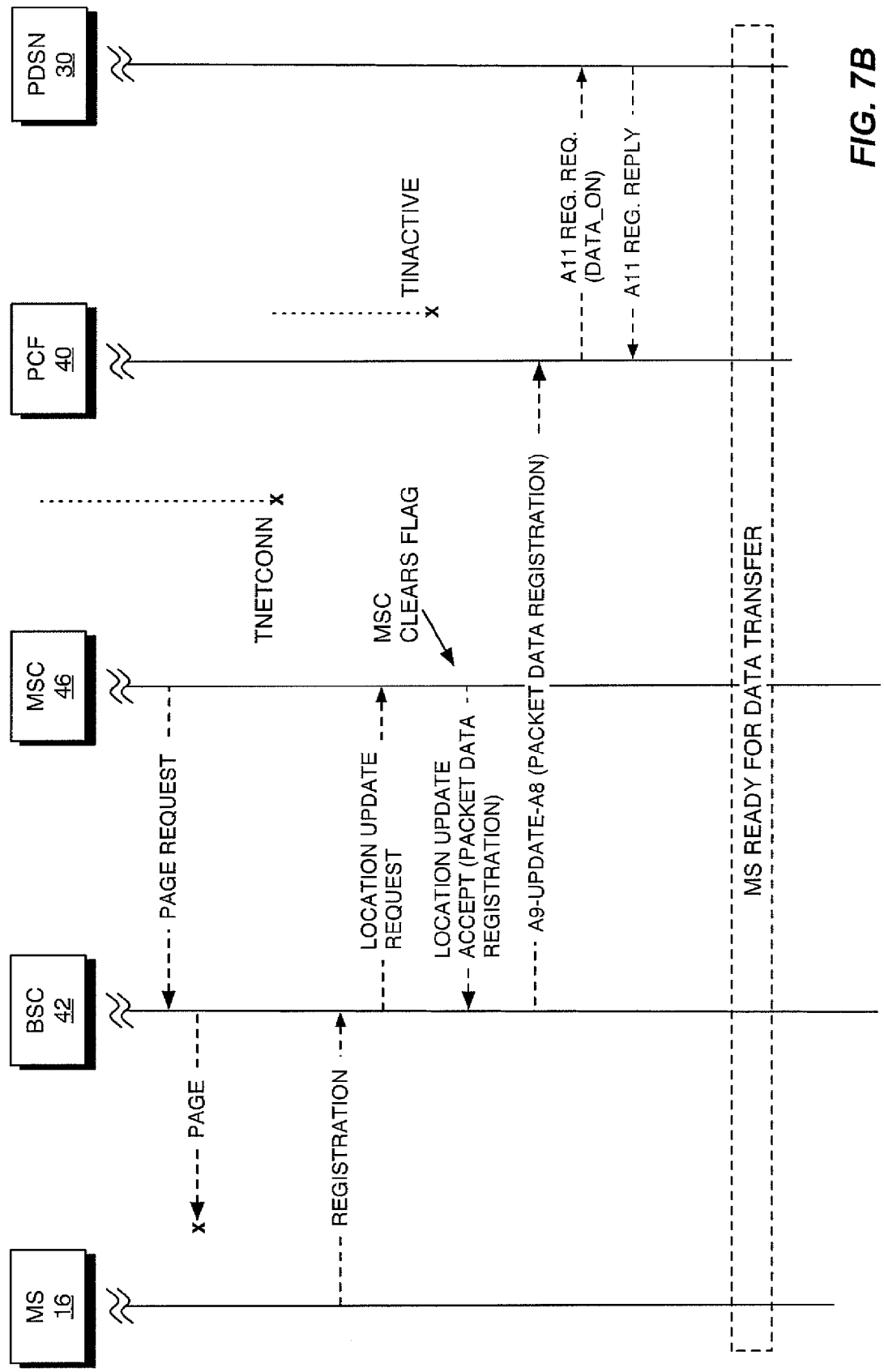

FIGS. 7A and 7B illustrate similar operations to those shown in FIGS. 5A and 5B but depict another mechanism for detecting a return to availability by a mobile station for which flow control has been invoked. In the illustration, the targeted mobile station does not respond to the repeated pages initiated by PCF 40, perhaps because it temporarily is in a radio "shadow." One should note that the expiration period of $T_{INACTIVE}$ may be set as needed or desired to balance the advantages gained from quickly determining that a flow-controlled mobile station has returned to availability versus the potential disadvantages associated with PCF 40 initiating pages too frequently.

If a mobile station 16 fails to respond to a page because it is temporarily out of coverage, it may move back into a coverage area before the next paging attempt and send a registration request. The request may be triggered by the periodic re-registration logic of the mobile station (i.e., timer-based re-registration), by its movement in the RAN 14 (i.e., mobility-event based re-registration), etc. In any case, the registration event is a clear indication of the mobile station's return to availability and thus may be used by PCF 40 to trigger its sending of a second flow control message to PDSN 30 requesting that flow control be turned off for the mobile station, i.e., that the data flow suspension be lifted from the mobile station's data connection(s).

Noting that registration events may be used by the PCF 40 as indicators of mobile station availability highlights the larger point that the present invention may, as explained earlier herein, take advantage of various network events as triggers for enabling or disabling data connection flow control. Broadly, once it is determined that a targeted mobile station 16 is unavailable for delivery of packet data and flow control is enabled for that mobile station, the PCF 40 may monitor for, or receive notification of one or more network events, from which it determines that the flow-controlled mobile station 16 has returned to availability. According to the present invention, the PCF 40 may play an active or passive role in that determination but once the determination is made, PCF 40 signals PDSN 30 to lift the data flow suspension for the mobile station 16.

Thus, if a flow-controlled mobile station registers with the network 10, MSC 46 can provide BSC 42 with notification of that event and in turn BSC 42 can signal PCF 40. MSC 46 may be configured to store information indicating which mobile stations are under flow control and send notification when any of those mobile stations register (re-register) with network 10. In this case, MSC 46 clears any flow-controlled flag or like indicator stored by it for such mobile stations 16. Alternatively, rather than provide registration notifications only for mobile stations specifically marked as flow-controlled, MSC 46 can be configured to send registration notifications to BSC 42 for any mobile station 16 having a dormant packet data connection. In that case, either BSC 42 or PCF 40 may be configured to sort out whether any such notification corresponds to a mobile station 16 that is under flow control.

Also, as mentioned earlier herein, the MSC 42 can be configured to send a return-to-availability notification at call teardown for a mobile station 16 wherein an earlier packet data session re-activation failed because the mobile station 16 was busy. Thus, when the service that precluded re-activation of the mobile station's packet data session is ended, MSC 42 sends, as part of the call clearing process, a notification to the BSC 42, which in turn notifies PCF 40. In response to such notification, PCF 40 requests that PDSN 30 turn flow control off for the mobile station 16.

Also, as noted earlier, PCF 40 may be configured to actively determine availability by actively monitoring for the mobile station's return to availability, such as by pinging—i.e., initiating one or more pages—for a flow-controlled mobile station. With that approach, the PCF 40 can select a pinging interval, e.g., once per minute, that allows relatively quick detection of a return to availability without imposing significant paging overhead on the network 10. $T_{INACTIVE}$ can be a dynamically adjusted timer that provides control to the PCF as to when and how to initiate re-connect attempts. For example $T_{INACTIVE}=2*T_{INACTIVE}$ (double the interval between re-tries each time).

Also, flow control may be applied to unreachable as well as "busy" mobile stations, i.e., a mobile station that is in radio contact but for which no additional radio channel(s) can be allocated for delivery of the pending packet data. In the busy case, the MSC 46 can inform BSC 42/PCF 40 about this state and the PCF 40 can invoke flow control immediately upon receipt of an A9-BS Service Response that indicates the busy condition. Instead, PCF 40 can start $T_{INACTIVE}$ to time a subsequent paging attempt.

Those skilled in the art should appreciate that discussion of the present invention in the context of cdma2000 (IS-2000) architectures and nomenclature should not be construed as limiting it to such contexts. While offering significant advantages to cdma2000 networks, the present invention more generally offers an apparatus and method allowing a RAN to notify a PCN as to the unavailability of mobile stations having established data connections at the PCN. So apprised, the PCN avoids the inefficiencies arising from the transfer of undeliverable packet data. As such, the present invention is not limited by the foregoing details and, indeed, is limited only by the following claims and their reasonable equivalents.

What is claimed is:

1. A method of flow control in a wireless communication network comprising:
   receiving data for a dormant mobile station at a Packet Control Function (PCF) for delivery to the mobile station;
   determining that the mobile station is unavailable for delivery of the data, wherein determining that the mobile station is unavailable for delivery of the data comprises determining whether the dormant mobile station can be activated for delivery of the data by sending a service request for the mobile station to an associated Base Station Controller (BSC) and starting a connection timer and, if the dormant mobile station has not responded before expiration of the connection timer, determining that the dormant mobile station cannot be re-activated for delivery of the data; and
   sending a message to a Packet Data Serving Node (PDSN) requesting it to turn flow control on for the mobile station by suspending further transfers of data to the PCF for the mobile station;
   subsequently determining that the mobile station has become available again; and
   in response to the mobile station availability, sending a message to the PDSN requesting it to turn flow control off for the mobile station by resuming transfers of data to the PCF for the mobile station;
   wherein the PCF requests the PDSN to suspend or resume transfers of data to the PCF for the mobile station based on including or omitting one or more flow control indications in defined registration messages generated by the PCF and sent to the PDSN.

2. The method of claim 1, wherein determining that the mobile station has become available again comprises receiving notification of a registration or origination event involving the mobile station.

3. The method of claim 1, wherein determining that the mobile station has become available again comprises sending a service request for the mobile station from the PCF to an associated Base Station Controller (BSC) included in the RAN and determining whether the RAN successfully establishes radio service for the mobile station.

4. The method of claim 1, wherein the PCF requests the PDSN to turn flow control on for the mobile station by including a data off indicator in a packet data registration message sent by the PCF to the PDSN for the mobile station.

5. The method of claim 4, wherein the PCF requests the PDSN to turn flow control off for the mobile station by not including the data off indicator in another packet data registration message sent by the PCF to the PDSN for the mobile station.

6. The method of claim 1, wherein determining whether the dormant mobile station can be re-activated for delivery of the data comprises, if the mobile station is busy such that delivery of packet data is precluded, starting a reactivation timer at the PCF and, upon expiration of the reactivation timer, sending a service request for the mobile station from the PCF to an associated Base Station Controller (BSC).

7. The method of claim 1, further comprising starting an activation timer upon expiration of the connection timer to time a subsequent transmission of a service request from the PCF to the BSC and, if the dormant mobile station does not respond to the subsequent service request, sending one or more additional service requests according to periodic expirations of the activation timer.

8. The method of claim 1, further comprising sending notifications of mobile station registration events from a Mobile Switching Center (MSC) of the network to a Base Station Controller (BSC) associated with the PCF to apprise the PCF regarding the availability of mobile stations.

9. The method of claim 8, further comprising, at the PCF, sending a message to the PDSN requesting that it turn off flow control for a particular mobile station responsive to receiving a notification of registration for that particular mobile station via the BSC.

10. The method of claim 1, further comprising, at a Mobile Switching Center (MSC), determining that flow control is turned on for a particular mobile station responsive to recognizing that the mobile station has failed to respond to a paging attempt initiated by the MSC responsive to an associated Base Station (BS) service request for the mobile station.

11. The method of claim 10, further comprising storing one or more flow control flags at the MSC to identify which particular mobile stations supported by the MSC are flow-controlled mobile stations, and further comprising sending notifications of mobile station registrations involving any flow-controlled mobile station to a BSC associated with the PCF so that the PCF is apprised whenever any flow-controlled mobile station is involved in a registration event.

12. A Packet Control Function (PCF) for use in a wireless communication that includes a Packet Core Network (PCN) and a Radio Access Network (RAN), the PCF comprising:
   a packet data interface circuit configured to support packet data connections between the RAN and the PCN; and
   a flow control circuit configured to request the PCN to suspend and resume data transfers as needed for one or more mobile station data connections based on the availability of those mobile stations for delivery of packet data;
   wherein, once the PCF requests the PCN to suspend data transfer for a particular mobile station, the PCF is configured to initiate one or more paging or short data delivery burst attempts for that particular mobile station to determine whether that particular mobile station has returned to availability, and wherein the flow control circuit includes an activation timer and the PCF is configured to initiate one of the paging attempts or one of the short data delivery attempts at each of one or more expiration intervals of the activation timer;
   wherein the PCF is further configured to request the PCN to suspend data transfers for a particular mobile station by requesting that a Packet Data Serving Node (PDSN) at the PCN turn flow control on for that particular mobile station, and is configured to request the PCN to resume data transfers as needed for a particular mobile station by requesting that the PDSN turn flow control off for that particular mobile station, wherein the PCF requests the PDSN to turn flow control on or off for the mobile station include or omit one or more flow control indications in defined registration messages generated by the PCF and sent to the PDSN.

13. The PCF of claim 12, wherein the PCF requests the PDSN to turn flow control on for a particular mobile station by sending a first flow control message and requests the PDSN to turn flow control off for that particular mobile station by sending a second flow control message.

14. The PCF of claim 12, wherein the PCF sends the first and second flow control messages to the PDSN as registration request messages but wherein it denotes a given registration request message as a first or second flow control message by including or not including, respectively, a data off indicator in the given registration request message.

15. The PCF of claim 12, wherein the PCF is configured to receive data from the PCN for delivery to a mobile station having an established data connection, and determine whether the mobile station is available for delivery of the data, and wherein the flow control circuit is configured to send a message requesting that the PCN suspend transfer of data to the PCF for the mobile station if the mobile station is unavailable.

16. The PCF of claim 15, wherein the PCF is configured to determine if the mobile station becomes available again, and wherein the flow control circuit is configured to send a message requesting the PCN to lift the suspension of data transfer for the mobile station if the mobile station becomes available again.

17. The PCF of claim 12, wherein the PCF is configured to determine whether a mobile station is available or unavailable by determining whether a radio link for the delivery of packet data can be timely established for the mobile station.

18. The PCF of claim 17, wherein the PCF is configured to determine whether a mobile station that previously was determined to be unavailable becomes available again, and to inform the PCN of that return to availability.

* * * * *